UNITED STATES PATENT OFFICE 2,192,958

COLORATION OF TEXTILE MATERIALS

Richard Thomas Wrathall, John Allan, and James Arthur Wainwright, Spondon, near Derby, England, assignors to Celanese Corporation of America, a corporation of Delaware No Drawing. Application May 12, 1938, Serial No. 207,509. In Great Britain June 16, 1937

16 Claims. (Cl. 8—64)

This invention relates to the treatment of textile materials and more particularly to a process of clearing discolored discharges on cellulose ester or cellulose ether materials (including partially saponified cellulose ester textile materials).

The discharge printing style affords a very convenient way of producing pattern effects on textile materials and has been widely used on cotton materials. Considerable difficulty is, however, encountered in applying it to materials of cellulose acetate even when the latter is partially saponified. Although there is no difficulty in obtaining clear white discharges on cotton fabrics partially saponified cellulose acetate fabrics often do not give clear discharges even when dyed with dyestuffs which are satisfactorily discharged on cotton. It appears that the decomposition products produced by discharge of the ground color are tenaciously retained by the partially saponified cellulose acetate fibres and cause discoloration of the discharge, particularly after the material has been stored for some time. This discoloration is particularly noticeable in white discharges. In the case of colored discharges the effect may be masked by the illuminating color. Similar defects are encountered in discharges on unsaponified cellulose acetate materials. Failure to obtain good white discharges is particularly frequent when the material, after application of the discharge composition and steaming, is subjected to an oxidation treatment, such for example as is required to develop a vat dye leuco ester used to illuminate discharges printed alongside the white discharges.

These difficulties have proved a serious obstacle to the development of the discharge printing style on cellulose acetate materials.

A method has now been found by which discharge effects on cellulose acetate materials can be greatly improved and clean white and colored discharges obtained. The method is particularly effective in the case of discharge effects on partially saponified cellulose acetate materials. The method consists in treating the discharged materials with an aqueous suspension of finely divided magnesium hydroxide in presence of an oxidising agent. Preferably the magnesium hydroxide is in a very finely dispersed state such as can be obtained by slowly adding a solution of a magnesium salt to caustic alkali solution in presence of a protective colloid. A quantity of magnesium hydroxide per litre equivalent to 3 to 12 grams or more of crystallised magnesium sulphate is suitable.

As the oxidising agent a perborate such as sodium perborate (used for example in a proportion of 1 to 3 grams per litre) is particularly effective though other oxidising agents may be used, e. g. hydrogen peroxide or ammonium persulphate. The oxidising agent should not be such as under the conditions employed will materially affect the ground color or any illuminating dye in the discharge.

Particularly good results are obtained if the treatment liquid contains, in addition to the magnesium hydroxide, an alkali preferably in amount sufficient by itself to impart alkalinity at least equal to that of a 0.25 gram per litre solution of sodium carbonate. This alkali may, wholly or in part, consist of the oxidising agent employed, e. g. sodium perborate. For example the suspension of magnesium hydroxide may contain about 1 to 3 grams per litre of sodium perborate and 0.25 to 1 gram per litre of sodium carbonate. Other alkali metal carbonates or other alkaline salts, e. g. borax or trisodium phosphate, or caustic alkalis may be used instead of sodium carbonate. Again, higher concentrations of alkali may be used, e. g. sodium carbonate or caustic soda up to 2 or 3 grams per litre.

As indicated above the magnesium hydroxide suspension is advantageously prepared by precipitation from a magnesium salt in presence of a protective colloid. The protective colloid can be one which is a detergent, dispersing agent, or wetting agent, and the presence of a detergent, dispersing agent, or wetting agent in the treatment liquor applied to the discharged goods is very beneficial. Sulphuric esters of higher fatty alcohols are especially useful in this connection. Other products containing no free carboxylic group and other detergents, dispersing agents, and wetting agents which are effective in the presence of magnesium compounds can, however, be employed, for example poly-ether alcohols, or sodium salts of condensation products of higher fatty acids with hydroxy- or amino-alkyl sulphonic acids.

When the magnesium hydroxide suspension is prepared by interaction of magnesium sulphate and caustic soda sodium sulphate is formed. The presence of this sodium sulphate is beneficial. The treatment liquor may have added thereto sodium sulphate, e. g. up to 10 grams or more per litre, additional to any produced in the course of preparing the magnesium hydroxide. In place of sodium sulphate other water-soluble salts inert towards the other constituents of the liquor may be used, particularly sodium chloride or other salts capable of reducing the solubility of dyes in water.

According to a modification of the new process the finely divided magnesium hydroxide is replaced by other finely divided solid adsorbents. Thus there may be employed the hydroxides of aluminum, zinc, cadmium, and beryllium, applied from dispersions prepared by methods similar to that described above in connection with magnesium hydroxide. Again, kaolin, fuller's earth, infusorial earth, colloidal china clay, finely divided silica, bentonite and animal charcoal can be used but it is preferred to use substances which, like magnesium hydroxide, have a pronounced basic character. Mixtures of adsorbents can be employed, e. g. a mixture of magnesium hydroxide and zinc hydroxide or a mixture of animal charcoal and colloidal china clay. If desired there can be used a substance which has oxidising powers and is an adsorbent or yields an adsorbent under the conditions of treatment, e. g. magnesium peroxide or zinc peroxide.

Treatment according to the invention can be effected by simple immersion of the discharged materials, after washing off and while still wet, in the aqueous liquid containing the magnesium hydroxide or other adsorbent and the oxidising agent. The treatment may be of relatively short duration and at a moderate temperature, e. g. for about 2 to about 30 minutes, e. g. 5 minutes, at a temperature of from about 55 to about 80° or 85° C., e. g. 65° C. The treated materials may then be well washed and dried.

The invention is illustrated by the following examples which are not, however, to be taken as limiting it in any way. The parts given are by weight.

*Example 1*

A crêpe fabric consisting of a weft and warp of cellulose acetate is dyed a dischargeable blue with 5% of Celliton Discharge Blue 3R and is printed in a double pattern with two zinc formaldehyde sulphoxylate discharge pastes made up as follows:

| | Parts |
|---|---|
| (a) Soluble zinc formaldehyde sulphoxylate | 25 |
| Ethylene thiodiglycol | 12 |
| Gum Tragon (60:1000) | 50 |
| Water | 13 |
| | 100 |

| | Parts |
|---|---|
| (b) Indigosol pink IR ex | 6 |
| Ethylene thiodiglycol | 12 |
| Soluble zinc formaldehyde sulphoxylate | 25 |
| Gum tragon (60:1000) | 50 |
| Water | 7 |
| | 100 |

The printed fabric is then aged for 5 minutes in a Mather and Platt hydro-sulphite ager, steamed for 20 minutes in a continuous steamer and hung for 24 hours in the air. The material is then treated with a bath prepared with 1% sodium bichromate and 1% sulphuric acid 168° Tw. for 1 minute at 65° C. in order to effect or complete hydrolysis and oxidation of the esterified leuco vat dyestuff. On rinsing well in water it is found that the discharge free from illuminant is tinted a strong beige shade. The material is then treated for 5 minutes at 85° C. in 50 times its weight of a liquor prepared from:

| | Parts |
|---|---|
| Magnesium sulphate crystals | 6.0 |
| Caustic soda | 2.0 |
| Sodium carbonate | 0.5 |
| Sodium perborate | 2.0 |
| Sodium sulphate | 7.0 |
| Gardinol R (registered trade-mark "Gardinol") | 1.0 |
| Water, to make | 1000 |

The treated material is then well washed and dried. The finished fabric exhibits a clear white pattern and a bright pink pattern on a blue ground.

*Example 2*

A crêpe fabric composed of a cellulose acetate warp and a viscose weft is shrunk and scoured and then partially saponified. It is then colored a navy shade by dyeing with 1.5% Diazamine Blue BR and 1.5% Chlorazol Black BH followed by diazotising and developing with β-naphthol.

The dyed fabric is then printed with the following discharge paste:

| | Parts by weight |
|---|---|
| Soluble zinc formaldehyde sulphoxylate | 200 |
| Glycine A | 120 |
| Gum Tragon 60:1000 | 500 |
| Water | 180 |
| | 1000 |

This print is then dried, aged 6 minutes in the Mather & Platt hydrosulphite ager and washed off. The print is then treated for 5 minutes at 85° C. in 50 times its weight of a liquor prepared from

| | Parts |
|---|---|
| Magnesium sulphate | 6.0 |
| Sodium hydroxide | 2.0 |
| Sodium carbonate | 0.5 |
| Sodium sulphate | 7.0 |
| Sodium perborate | 2.0 |
| Gardinol R | 1.0 |
| Water, to make | 1000 |

The material is finally rinsed free from precipitated magnesium hydroxide and dried. A sparkling white discharge on a navy ground is thus obtained.

*Example 3*

A crêpe fabric composed of a cellulose acetate warp and viscose weft is shrunk, scoured, partially saponified, then dyed to a black shade with 3.0% Chlorazol Black BH and 1.5% Diazophenyl Orange R followed by diazotisation and development in β-naphthol.

The dyed fabric is then printed with a discharge paste consisting of

| | Parts by weight |
|---|---|
| Formosul | 175 |
| Diethylene glycol | 100 |
| Gum Tragon 60:1000 | 550 |
| Water | 175 |
| | 1000 | dried, aged 5–6 minutes in the Mather & Platt hydrosulphite ager and washed off. The material is then treated with a magnesium hydroxide dispersion as described in Example 2. A sparkling white discharge on a black ground is obtained.

Although the invention has been described with particular reference to materials consisting of or containing cellulose acetate or partially saponified cellulose acetate, it is applicable in the production of pattern effects on materials consisting of or containing other cellulose esters and ethers or other partially saponified cellulose esters. For instance, it is applicable in the production of pattern effects on materials of cellulose formate, cellulose butyrate, or cellulose propionate, and other esters of cellulose and materials of methyl, butyl, propyl, amyl and benzyl celluloses and other ethers of cellulose, and, further, on materials of partially saponified cellulose formate, cellulose butyrate, cellulose propionate and other partially saponified esters of cellulose.

Having described our invention, what we desire to secure by Letters Patent is:

1. Process for improving discharge effects on cellulose ester or ether textile materials, which comprises subjecting the discharged materials to the action of an aqueous liquid containing a finely divided solid adsorbent and an oxidizing agent to which the dyes on the materials are resistant.

2. Process for improving discharge effects on cellulose ester or ether textile materials, which comprises subjecting the discharged materials to the action of an aqueous liquid containing finely divided magnesium hydroxide and an oxidizing agent to which the dyes on the materials are resistant.

3. Process for improving discharge effects on cellulose ester or ether textile materials which comprises subjecting the discharged materials to the action of an aqueous alkaline liquid containing a perborate and finely divided magnesium hydroxide.

4. Process for improving discharge effects on cellulose acetate textile materials, which comprises subjecting the discharged materials to the action of an aqueous liquid containing a finely divided solid adsorbent and an oxidizing agent to which the dyes on the materials are resistant.

5. Process for improving discharge effects on cellulose acetate textile materials, which comprises subjecting the discharged materials to the action of an aqueous liquid containing finely divided magnesium hydroxide and an oxidizing agent to which the dyes on the materials are resistant.

6. Process for improving discharge effects on cellulose acetate textile materials, which comprises subjecting the discharged materials to the action of an aqueous alkaline liquid containing a perborate and finely divided magnesium hydroxide.

7. Process for improving discharge effects on cellulose acetate textile materials, which comprises subjecting the discharged materials to the action of an aqueous liquid containing an oxidizing agent to which the dyes on the material are resistant and finely divided magnesium hydroxide prepared in the liquid by interaction of a magnesium salt and caustic alkali in presence of a protective colloid.

8. Process for improving discharge effects on cellulose acetate textile materials, which comprises subjecting the discharged materials to the action of an aqueous liquid containing a finely divided solid adsorbent and an oxidizing agent to which the dyes on the materials are resistant, said liquid having an alkalinity at least equal to that of a 0.25 gram per litre solution of sodium carbonate.

9. Process for improving discharge effects on cellulose acetate textile materials, which comprises subjecting the discharged materials to the action of an aqueous liquid containing finely divided magnesium hydroxide, an alkali metal carbonate or hydroxide, a protective colloid and an oxidizing agent to which the dyes on the materials are resistant.

10. Process for improving discharge effects on cellulose acetate textile materials, which comprises subjecting the discharged materials to the action of an aqueous liquid containing finely divided magnesium hydroxide, from 0.25 to 1 gram per litre of sodium carbonate or hydroxide, a protective colloid and an oxidizing agent to which the dyes on the materials are resistant.

11. Process for improving discharge effects on cellulose acetate textile materials, which comprises subjecting the discharged materials to the action of an aqueous liquid containing finely divided magnesium hydroxide, from 0.25 to 1 gram per litre of sodium carbonate or hydroxide, a sulphuric ester of a higher fatty alcohol and an oxidizing agent to which the dyes on the materials are resistant.

12. Process for improving discharge effects on cellulose acetate textile materials, which comprises subjecting the discharged materials to the action of an aqueous liquid containing from 1 to 3 grams per litre of sodium perborate and from 0.7 to 2.8 grams per litre of finely divided magnesium hydroxide, said liquid having an alkalinity equal to that of a 0.25 to 3 grams per litre solution of sodium carbonate.

13. Process for improving discharge effects on partially saponified cellulose acetate textile materials, which comprises subjecting the discharged materials to the action of an aqueous liquid containing finely divided magnesium hydroxide and an oxidizing agent to which the dyes on the materials are resistant.

14. Process for improving discharge effects on partially saponified cellulose acetate textile materials, which comprises subjecting the discharged materials to the action of an aqueous liquid containing finely divided magnesium hydroxide and an oxidizing agent to which the dyes on the materials are resistant, said liquid having an alkalinity equal to that of a 0.25 to 3 grams per litre solution of sodium carbonate.

15. Process for improving discharge effects on partially saponified cellulose acetate textile materials, which comprises subjecting the discharged materials to the action of an aqueous liquid containing finely divided magnesium hydroxide, an oxiding agent to which the dyes on the materials are resistant, an alkali metal carbonate or hydroxide and a protective colloid.

16. Process for improving discharge effects on partially saponified cellulose acetate textile materials, which comprises subjecting the discharged materials to the action of an aqueous liquid containing finely divided magnesium hydroxide, a perborate, from 0.25 to 1 gram per litre of sodium carbonate or hydroxide, and a sulphuric ester of a higher fatty alcohol.

RICHARD THOMAS WRATHALL.
JOHN ALLAN.
JAMES ARTHUR WAINWRIGHT.